(12) United States Patent
Bailey et al.

(10) Patent No.: US 6,354,408 B1
(45) Date of Patent: Mar. 12, 2002

(54) ADAPTER PLATE FOR DISC BRAKE INSTALLATION

(75) Inventors: Ronald Bailey, Elyria; Dennis Shamine, Lorain, both of OH (US)

(73) Assignee: AlliedSignal Truck Brake Systems Company, Elyria, OH (US)

(*) Notice: Subject to any disclaimer, the term of this patent is extended or adjusted under 35 U.S.C. 154(b) by 0 days.

(21) Appl. No.: 09/460,147

(22) Filed: Dec. 13, 1999

(51) Int. Cl.[7] .............................................. F16D 65/38
(52) U.S. Cl. ................................ 188/73.39; 188/73.46
(58) Field of Search ........................... 188/73.39, 73.46

(56) References Cited

U.S. PATENT DOCUMENTS

| | | | | |
|---|---|---|---|---|
| 3,907,081 A | * | 9/1975 | Smith et al. ................. 188/73.3 |
| 3,999,635 A | | 12/1976 | Hotchkiss | |
| 4,311,216 A | * | 1/1982 | Garrett et al. ............. 188/18 A |
| 4,319,668 A | | 3/1982 | Johnson et al. | |
| 4,461,372 A | * | 7/1984 | Bekkala et al. ........... 188/73.34 |
| 5,202,383 A | | 4/1993 | Terashima | |
| 5,462,139 A | * | 10/1995 | Jones, Jr. et al. ........ 188/206 R |
| 5,564,532 A | * | 10/1996 | Baba et al. ............... 188/73.39 |
| 5,590,742 A | * | 1/1997 | Gutelius ................... 188/70 R |
| 5,826,682 A | * | 10/1998 | Goettker .................... 188/72.4 |
| 5,865,275 A | * | 2/1999 | Anger et al. ............... 188/18 A |
| 5,915,505 A | * | 6/1999 | Uhlig ....................... 188/73.37 |
| 5,979,611 A | * | 11/1999 | Sasaki et al. ............. 188/73.43 |

FOREIGN PATENT DOCUMENTS

DE         196 26 297 A1    7/1996

* cited by examiner

Primary Examiner—Christopher P. Schwartz
Assistant Examiner—Benjamin A. Pezzlo

(57) ABSTRACT

An adapter plate for a caliper disc brake assembly is attached to the inboard side of the axle flange of a vehicle axle housing. The adapter plate is generally C-shaped to allow mounting around the central region of the axle housing. The inboard positioning of the adapter plate allows mounting of larger brake calipers within a confined space. The caliper is connected to the axle housing by the adapter plate for the purpose of positioning the caliper relative to the rotor and resisting the torque developed by the action of the brake pads on the rotor. In order to adjust the lateral position of the caliper, the adapter plate, in one embodiment, has a pilot surface which allows the axle flange to be recessed within the adapter plate. In another embodiment, a secondary adapter plate bridges over the opening in the adapter plate to allow mounting of the adapter assembly to the entire bolt circle of the axle flange.

18 Claims, 4 Drawing Sheets

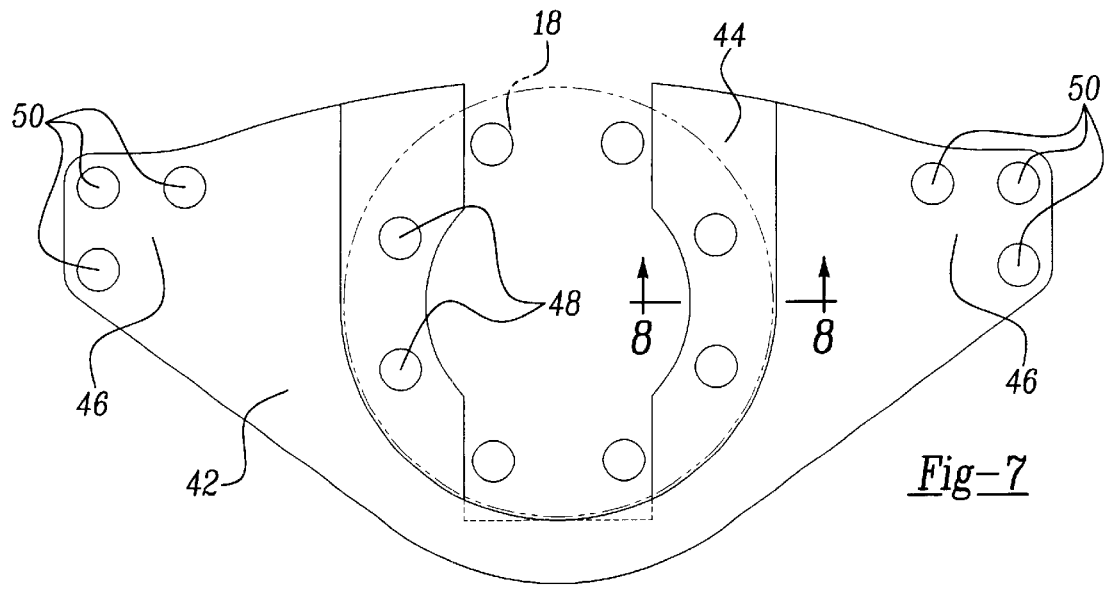
_Fig-7_
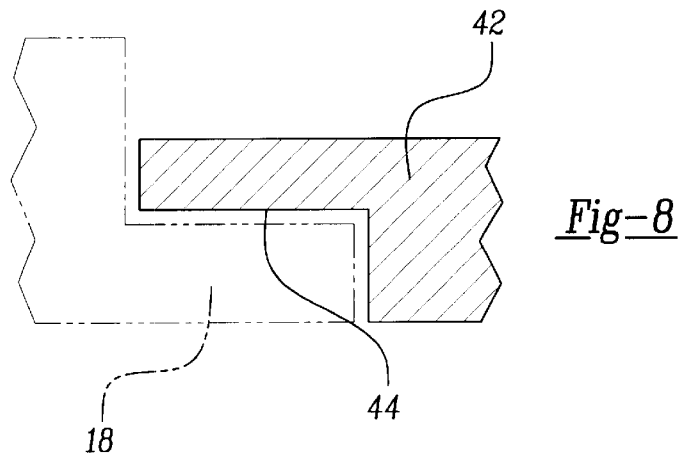
_Fig-8_
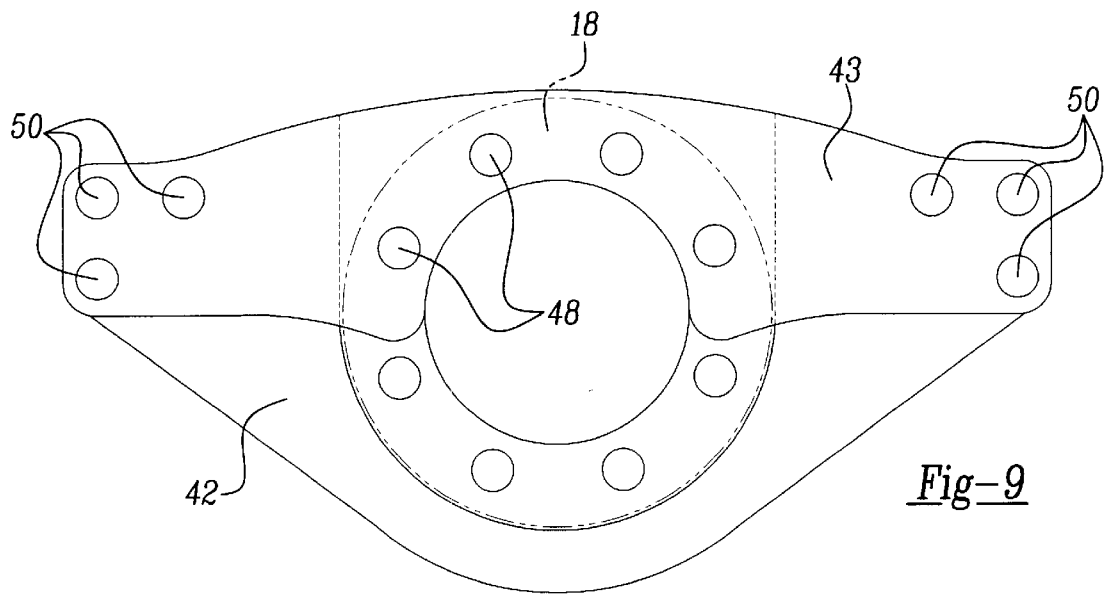
_Fig-9_

ADAPTER PLATE FOR DISC BRAKE INSTALLATION

TECHNICAL FIELD OF THE INVENTION

The present invention relates generally to vehicle brake apparatuses and is particularly concerned with caliper disc brakes for heavy-duty motor vehicles. Still more particularly, the invention relates to a disc brake adapter plate for attaching a brake caliper to a vehicle axle housing.

BACKGROUND OF THE INVENTION

Caliper disc brakes are well known in the art. A disc brake for a heavy duty vehicle, such as a truck, typically requires a caliper to be mounted to an axle housing by fixed structure or by a separately fabricated adapter plate. The purpose of the adapter plate is to properly position the caliper and to react the torque developed when the caliper engages the disc brake rotor. The torque is resisted through the adapter plate to the axle flange of the axle housing and subsequently through the vehicle suspension to the vehicle chassis. The adapter plate is required to interface with the axle housings and caliper and to allow detachable mounting of the caliper for assembly or service.

In the automotive industry, it is highly desirable to use carry-over designs of existing complex components for new vehicle programs, such as axle housings and disc brake calipers, but these components must be fit within the dimensional requirements of the vehicle design. Because the adapter plate must react all of the torque developed by the disc brake, it is necessarily a robust component. Generally, adapter plates have been attached outboard, that is, toward the wheel side, of the axle flange. When packaging the wheel and axle assembly, the additional width required for an adapter plate between the axle flange and caliper may not allow a given axle housing and caliper to properly fit the desired envelope. This problem is particularly evident when attempting to package disc brake calipers originally designed for European vehicles with single wheels. Dual wheels are typically used on North American vehicles. The total width of a dual wheel assembly is generally wider than a single European wheel assembly. In a particular application where a caliper design for a European vehicle is to be packaged in a North American vehicle with dual wheels, there is not sufficient width within the envelope to allow use of a conventional adapter plate. Therefore, there is a need for an adapter plate configuration which allows the caliper to be moved further inboard relative to the axle flange compared with the caliper position allowed by a conventional adapter plate.

SUMMARY OF THE INVENTION

Accordingly, it is the principal object of the present invention to provide an adapter plate for a caliper disc brake assembly which permits use of existing components. It is another object of the present invention to provide a method of precisely locating the caliper relative to the axle flange. Yet another object of the present invention is to allow easy assembly and disassembly of the adapter plate to existing types of axle housings, axle flanges and brake calipers.

According to the above objects of the invention, there is provided an adapter plate for a vehicle caliper disc brake assembly, which assembly has a revolving disc or brake rotor, connected to a hub and wheel, which rotates as the hub and wheel rotate, and a caliper which urges brake pads against the revolving rotor. The caliper and carrier are connected to the axle housing by the adapter plate at the axle flange for the purpose of positioning the caliper relative to the rotor and resisting the torque developed by the action of the brake pads on the rotor. In order to move the caliper inboard toward the vehicle center, in accordance with this invention, the adapter plate is mounted to the inboard surface of the axle flange using bolts or other fastening means which pass through matching patterns of mounting holes on the adapter and flange.

BRIEF DESCRIPTION OF THE DRAWINGS

Further features and advantages of the invention will become apparent from the following discussion and accompanying drawings, in which:

FIG. 7 is a plan view of the adapter plate shown in FIGS. 3 and 4;

FIG. 8 is a partial section through 8—8 in FIG. 7; and

FIG. 9 is a plan view of the adapter plate and secondary adapter plate shown in FIGS. 5 and 6.

DESCRIPTION OF THE PRIOR ART

Figure 1:
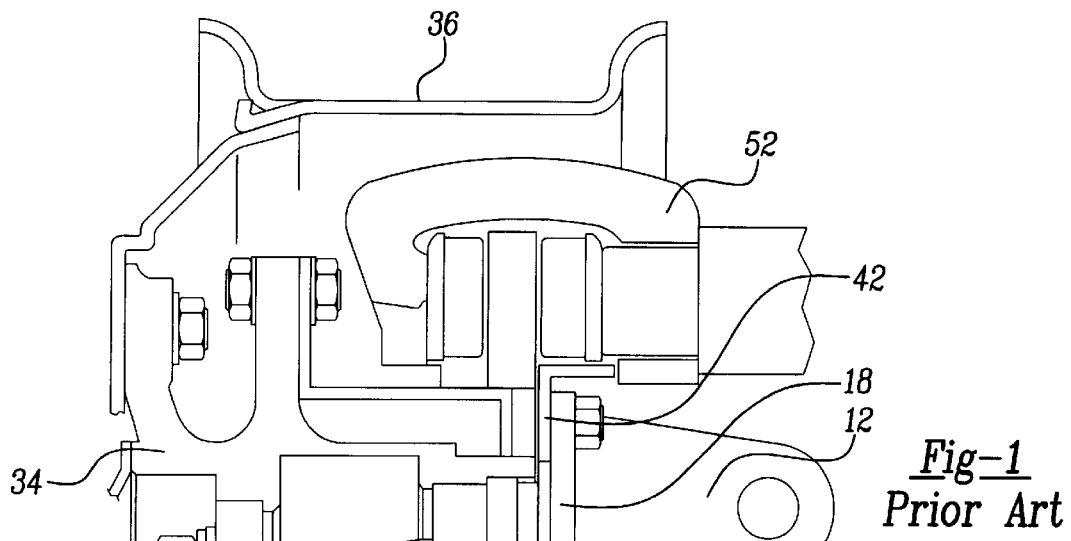
FIG. 1 is a simplified side view of a wheel and axle assembly including an adapter plate in accordance with the prior art.
Figure 2:
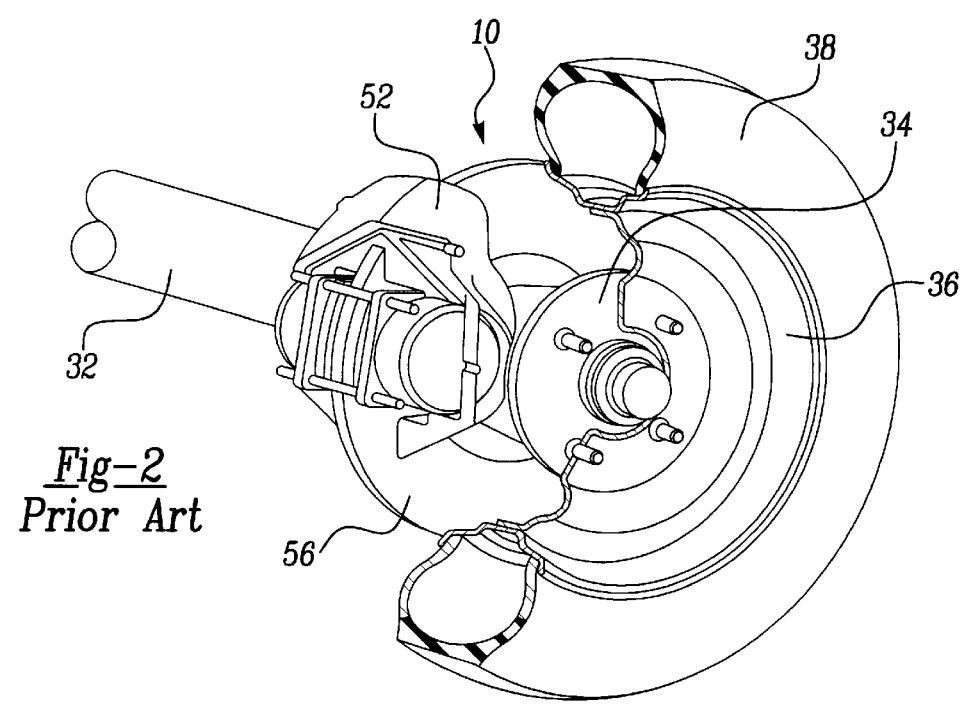
FIG. 2 is a perspective view of a wheel and axle assembly according to the prior art.

Shown schematically in FIG. 1 and presented in perspective view in FIG. 2, are illustrations of a typical prior art structure of caliper disc brakes. The wheel and axle assembly 10 generally fits within a wheel well of the vehicle. Attached to the vehicle through the suspension system is the front axle 32 to which is pivotally attached a front axle housing 12. The axle housing 12 incorporates a projecting stub axle 16 for the purpose of mounting, through bearing means, a hub 34, upon which are attached a wheel 36, with tire 38, and a brake rotor 56.

The axle housing 12 includes axle flange 18 to which is secured by way of adapter plate 42, a brake caliper 52. The adapter plate 42 functions to position the caliper 52 precisely with respect to the brake rotor 56. Additionally, the adapter plate 42 reacts the torque which results when the caliper 52 is engaged on the rotor 56.

DETAILED DESCRIPTION OF THE PREFERRED EMBODIMENT

Figure 3:
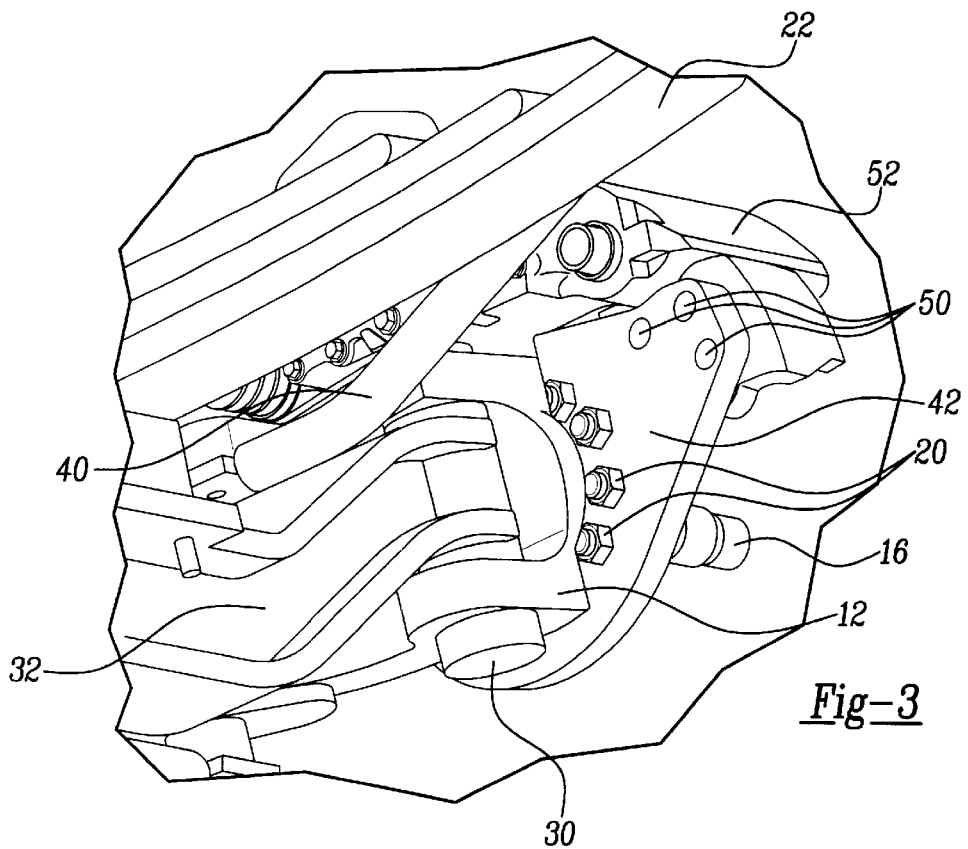
FIG. 3 is an inboard view of an adapter plate according to the present invention on a front steering axle housing.
Figure 4:
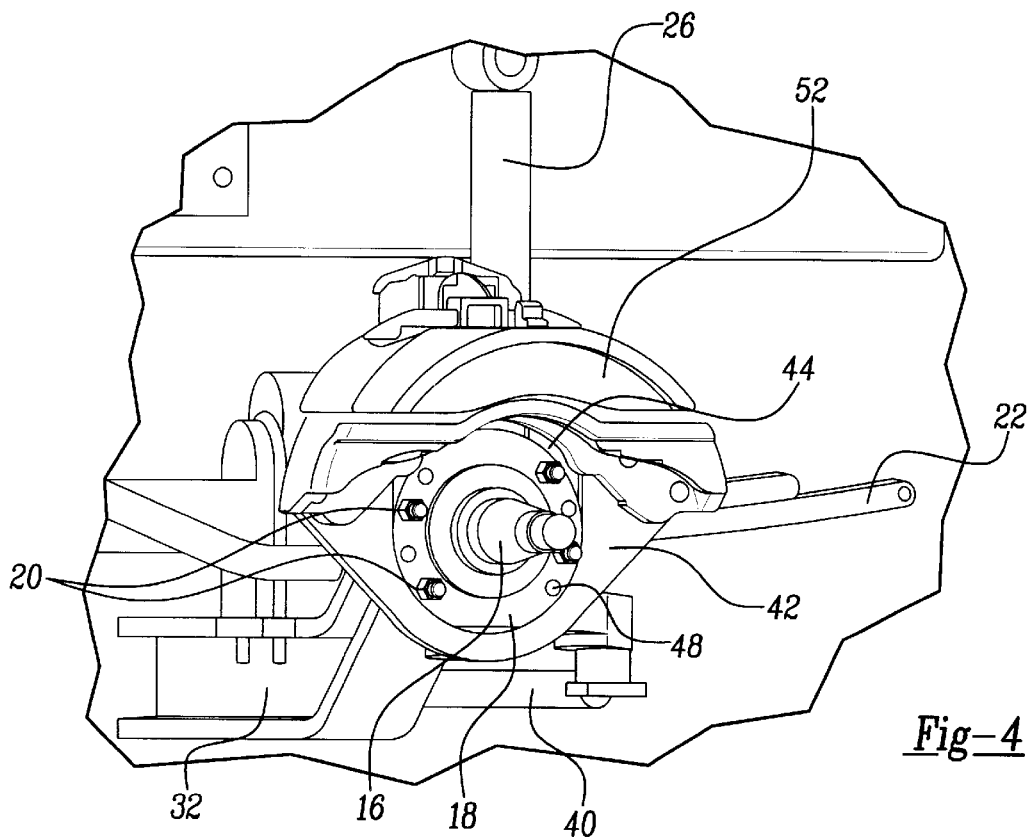
FIG. 4 is an outboard view of the embodiment shown in FIG. 3.

Referring now to FIGS. 3 and 4, showing a partial view of the front steering and suspension system for a heavy duty vehicle, a generally C-shaped adapter plate 42 is shown mounted to a front axle housing 12. The axle housing 12 is pivotally mounted to the front axle 32 by the king pin 30 with control arm 40 determining the angular position of the axle housing 12 relative to the axle 32. The axle 32 is in turn suspended by the leaf spring 22 and shock absorber 26 which attach to the vehicle frame. The axle housing 12 incorporates a stub axle 16 and an axle flange 18. Also shown is disc brake caliper 52.

The adapter plate 42 is mounted to the inboard or non-wheel side of the axle flange 18 through flange mounting holes 48 by the use of flange bolts 20. Bolts 20 can be a nut and bolt assembly or, alternatively, bolts 20 can be threaded members which are received within threaded bores defined through axle flange 18 or alternatively, threaded bores defined through adapter plate 42. A pilot surface 44 is machined in the adapter plate 42 to allow the adapter plate 42 to conform closely to a semi-circular circumference of the axle flange 18 for the purpose of piloting the adapter plate 42 onto the axle flange 18. The depth of the pilot surface 44 allows the axle to be recessed within the adapter plate 42 to facilitate lateral adjustment of the position of the caliper mounting surface 46 as shown in FIGS. 7 and 8. The open side (C-shape) of the adapter plate 42 allows assembly of the adapter plate 42 on the inboard side of the axle flange 18 which would not be possible with the annular disc shape of the prior art adapter plates. The C-shape of the adapter plate 42, with the extensions of pilot surface 44, allows a sufficient quantity of the mounting holes of the axle flange 18 to be used by the flange bolts 20 to provide the necessary rigidity and torque resistance.

Figure 5:
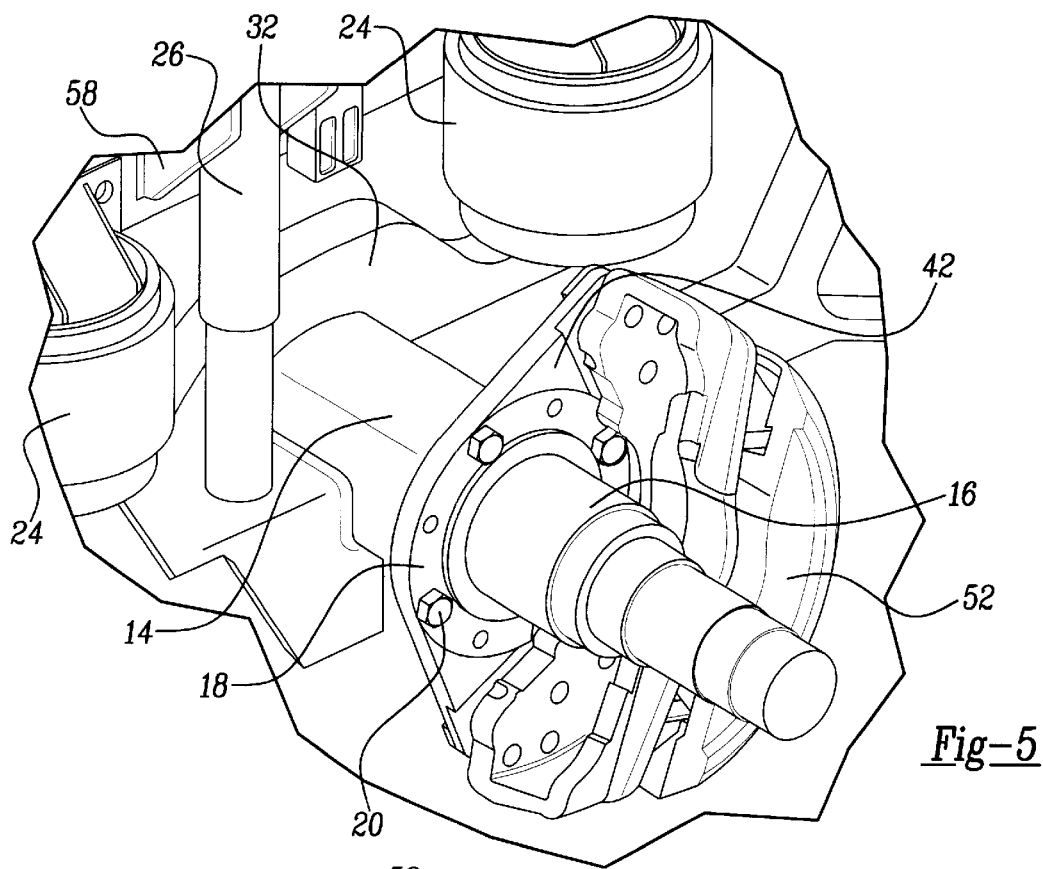
FIG. 5 is an outboard board view of an adapter plate designed in accordance with the current invention on a rear axle housing.
Figure 6:
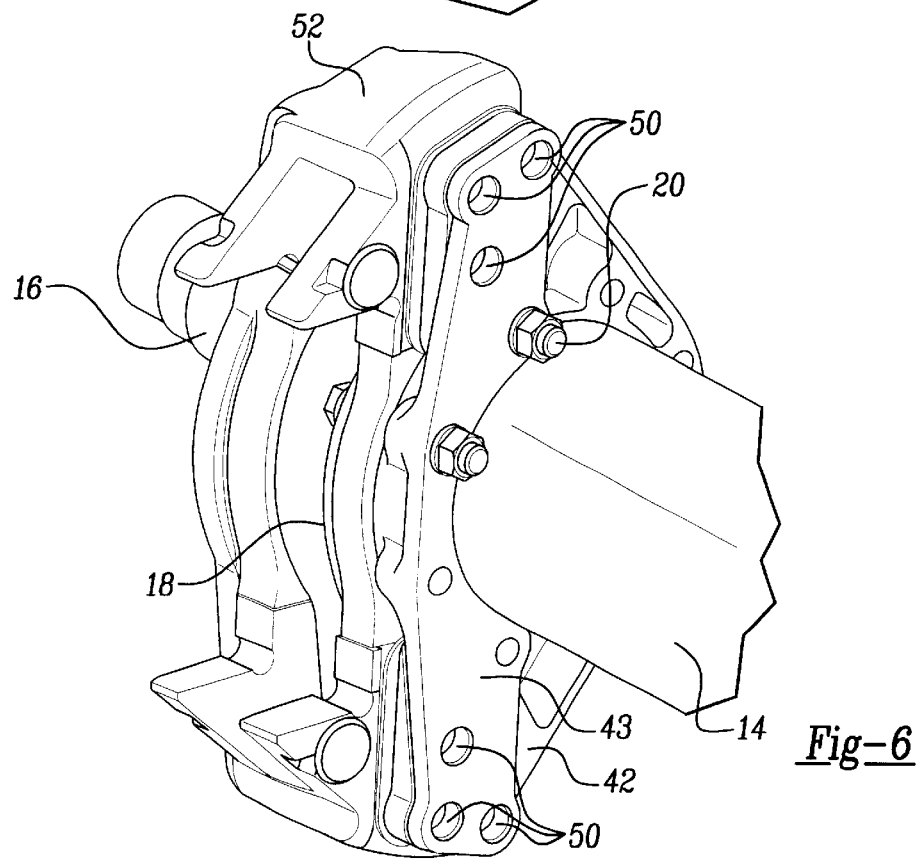
FIG. 6 is an inboard view of the embodiment shown in FIG. 5.

Referring now to FIGS. 5 and 6, showing a partial view of the rear axle assembly of a heavy duty vehicle, the adapter plate 42 is shown mounted on a rear axle housing 14 fixedly attached to axle 32. A secondary adapter plate 43, best shown in FIG. 9, overlaps the caliper mounting hole 50 areas of the adapter plate 42, and bridges over the gap in the adapter plate 42, allowing a complete encirclement of the rear axle housing 14 and provides a means of structurally attaching the brake caliper 52 to the entire bolt hole circle of the inboard side of the axle flange 18. The axle 32 is in turn suspended by the air springs 24 and shock absorber 26 which attach to the vehicle frame member 58. This rear axle embodiment differs from the embodiment for a front axle housing 12 in that the adapter plate 42 and caliper 52 are rotated approximately 90° about the axle flange 18, there is no pilot surface 44, and the open center section in the adapter plate 42 is closed by the secondary adapter plate 43.

Referring now to FIGS. 7 and 8, the adapter plate 42 for the front embodiment is shown in detail. The caliper mounting surfaces 46 include caliper mounting holes 50 for attachment of the caliper 52 with the caliper bolts 20. The pilot surface 44 is recessed to conform with the axle flange 18, as seen in FIG. 8. The adapter plate 42 includes a suitable open center section to facilitate installation and allows, through the extending arms of the pilot surface 44, the adapter plate 42 to partially circumscribe the central axle region of the axle housings 12 or 14. The pilot surface includes flange mounting holes 48 which align with the majority of the corresponding holes in the axle flange 18 for mounting of the adapter plate 42 with flange bolts 20. The lateral symmetry of the adapter plate 42 allows use with either a left or right side axle housing 12 or 14.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

We claim:

1. An adapter plate for a vehicle caliper disc brake assembly, the assembly including a revolving brake rotor adapted to be connected to a hub and a brake caliper capable of urging at least one brake pad against the rotor when the brake assembly is actuated, the caliper being mounted to the adapter plate, the adapter plate being mounted to an axle flange having a hole pattern, the axle flange having inboard and outboard surfaces, the axle flange connected to an axle housing, the adapter plate comprising:

a generally C-shaped adapter plate having a center section and a pair of extending arms having ends defining an opening, the arms being adapted to generally partially circumscribe the axle housing and the opening, allowing the mounting of the adapter plate to the inboard surface of the axle flange, the adapter plate having attachment features to mount the caliper, and further having a recessed pilot surface defining a wall which closely conforms with the axle flange whereby the axle flange is received within the recessed pilot surface of the adapter plate, the depth of the pilot surface partially determining the lateral position of the caliper.

2. The adapter plate of claim 1 wherein a surface is provided to mount a brake caliper using through holes.

3. The adapter plate of claim 1 wherein a surface and through holes are provided to mount to an axle housing flange using through bolts and nuts.

4. The adapter plate of claim 1 wherein the adapter plate is laterally symmetrical to allow use on either a left or right axle housing.

5. The adapter plate of claim 1 further comprising a secondary adapter plate which attaches to the extending arms of the adapter plate and bridges over the opening in the adapter plate.

6. The adapter plate of claim 5 wherein the adapter plate and secondary adapter plate assemble to provide a means of attaching the brake caliper to the entire hole pattern of the inboard side of the axle flange.

7. An axle and hub assembly for a vehicle, the assembly including an axle, an axle housing, a hub and a caliper disc brake assembly, the caliper disc brake assembly including a revolving brake rotor adapted to be connected to the hub and a brake caliper capable of urging at least one brake pad against the rotor when the brake assembly is actuated, the caliper being mounted to an adapter plate, the adapter plate being mounted to an axle flange having a hole pattern, the axle flange having inboard and outboard surfaces, the axle flange connected to an axle housing, the adapter plate comprising:

a generally C-shaped adapter plate having a center section and a pair of extending arms having ends defining an opening, the arms being adapted to generally partially circumscribe the axle housing and the opening allowing mounting of the adapter plate to the inboard surface of the axle flange, the adapter plate having attachment features to mount the caliper, and further having a recessed pilot surface defining a wall which closely conforms with the axle flange whereby the axle flange is received within the recessed pilot surface of the adapter plate, the depth of the pilot surface partially determining the lateral position of the caliper.

8. The axle and hub assembly of claim 7 wherein the adapter plate further comprises a surface to mount a brake caliper using through holes.

9. The axle and hub assembly of claim 7 wherein the adapter plate further comprises a surface and through holes to mount to an axle housing flange using through bolts and nuts.

10. The axle and hub assembly of claim 7 wherein the adapter plate is laterally symmetrical to allow use on either a left or right axle housing.

11. The axle and hub assembly of claim 7 further comprising a secondary adapter plate which attaches to the extending arms of the adapter plate and bridges over the opening in the adapter plate.

12. The axle and hub assembly of claim 11 wherein the adapter plate and secondary adapter plate assemble to provide a means of attaching the brake caliper to the entire bolt hole circle of the inboard side of the axle housing flange.

13. A method for attaching a disc brake caliper to a vehicle axle housing comprising the steps of:
   (a) providing an axle housing with an axle flange having an inboard mounting surface;
   (b) providing a generally C-shaped adapter plate having a recessed pilot surface partially conforming to the axle flange, and a brake caliper;
   (c) attaching the adapter plate to the inboard side of the axle flange by bolt means so as to fit the recessed pilot surface around a portion of the axle flange; and
   (d) attaching the brake caliper to the brake adapter by bolt means, the depth of the pilot surface partially determining the lateral position of the caliper.

14. A method for attaching a disc brake caliper to a vehicle axle housing comprising the steps of:
   (a) providing an axle housing with an axle flange having an inboard mounting surface;
   (b) providing a generally C-shaped adapter plate partially conforming to the axle flange, and a brake caliper;
   (c) providing a secondary adapter plate configured to attach to the extending arms of the adapter plate and bridge over the opening in the adapter plate;
   (d) attaching the adapter plate to the inboard side of the axle flange by bolt means so as to fit around a portion of the axle flange;
   (e) attaching the secondary adapter plate to the inboard side of the axle flange by bolt means so as to fit around the remaining portion of the axle flange;
   (f) attaching the secondary adapter plate to the adapter plate by bolt means; and
   (g) attaching the brake caliper to the brake adapter by bolt means.

15. An adapter plate for a vehicle caliper disc brake assembly, the assembly including a revolving brake rotor adapted to be connected to a hub and a brake caliper capable of urging at least one brake pad against the rotor when the brake assembly is actuated, the caliper being mounted to the adapter plate, the adapter plate being mounted to an axle flange having a hole pattern, the axle flange having inboard and outboard surfaces, the axle flange connected to an axle housing, the adapter plate comprising:
   a generally C-shaped adapter plate having a center section and a pair of extending arms having ends defining an opening, the arms being adapted to generally partially circumscribe the axle housing and the opening, allowing the mounting of the adapter plate to the inboard surface of the axle flange, the adapter plate having attachment features to mount the caliper; and
   a secondary adapter plate which attaches to said extending arms and bridges over said opening.

16. The adapter plate of claim 15 wherein the adapter plate and the secondary adapter plate assemble to provide a means of attaching the brake caliper to the entire hole pattern of the inboard side of the axle flange.

17. An axle and hub assembly for a vehicle, the assembly including an axle, an axle housing, a hub and a caliper disc brake assembly, the caliper disc brake assembly including a revolving brake rotor adapted to be connected to the hub and a brake caliper capable of urging at least one brake pad against the rotor when the brake assembly is actuated, the caliper being mounted to an adapter plate, the adapter plate being mounted to an axle flange having a hole pattern, the axle flange having inboard and outboard surfaces, the axle flange connected to an axle housing, the adapter plate comprising:
   a generally C-shaped adapter plate having a center section and a pair of extending arms having ends defining an opening, the arms being adapted to generally partially circumscribe the axle housing and the opening allowing mounting of the adapter plate to the inboard surface of the axle flange, the adapter plate having attachment features to mount the caliper; and
   a secondary adapter plate which attaches to said extending arms and bridges over said opening.

18. The axle and hub assembly of claim 17 wherein the adapter plate and the secondary adapter plate assemble to provide a means of attaching the brake caliper to the entire hole pattern of the inboard side of the axle flange.

* * * * *